United States Patent [19]

Mayerjak

[11] 4,156,583

[45] May 29, 1979

[54] HUB ASSEMBLY

[75] Inventor: Robert J. Mayerjak, Torrington, Conn.

[73] Assignee: Kaman Aerospace Corporation, Bloomfield, Conn.

[21] Appl. No.: 814,707

[22] Filed: Jul. 11, 1977

[51] Int. Cl.² ............................................ B64C 11/06
[52] U.S. Cl. .............................. 416/208; 416/134 A; 416/244 R
[58] Field of Search ............... 416/244 R, 208, 134 A, 416/138 A, 140 A, 214 R

[56] References Cited

U.S. PATENT DOCUMENTS

| | | | |
|---|---|---|---|
| 2,549,887 | 4/1951 | Buivid | 416/140 A X |
| 2,573,875 | 11/1951 | Riddiford | 416/208 |
| 2,774,553 | 12/1956 | Jensen | 416/140 A X |
| 3,032,120 | 1/1962 | Lee et al. | 416/244 X |
| 3,053,437 | 9/1962 | Ambrose | 416/244 A X |
| 3,310,119 | 3/1967 | Watson | 416/134 A X |
| 3,384,185 | 5/1968 | Fernandez | 416/244 |
| 3,761,199 | 9/1973 | Ferris et al. | 416/244 X |
| 4,028,001 | 6/1977 | Watson | 416/134 A |

FOREIGN PATENT DOCUMENTS 610916  12/1960 Canada ............................. 416/140 A Primary Examiner—Everette A. Powell, Jr.
Attorney, Agent, or Firm—McCormick, Paulding & Huber

[57] ABSTRACT

A hub assembly for an articulated rotor system mounted on a rotor shaft comprises three plates centrally secured to the rotor shaft. The plates include generally radially disposed and axially spaced apart upper and lower plates and a cone shaped pan plate. The upper plate and pan plate have outer marginal portions transversely connected in adjacent relation and central portions connected to the rotor shaft in axially spaced apart relation. The upper plate and pan plate cooperate with the rotor shaft to form a truss for supporting blade retention assemblies equally spaced about the rotor shaft axis and mounted intermediate the upper and lower plates. One of the plates has a scalloped central aperture which cooperates with the scalloped mounting flange on the rotor shaft to facilitate angular orientation for bolt alignment during hub assembly installation.

21 Claims, 8 Drawing Figures

HUB ASSEMBLY

BACKGROUND OF THE INVENTION

This invention relates in general to rotor systems for helicopters and deals more particularly with improved hub assemblies for such rotor systems.

Rotor hub structures for large helicopters are generally quite heavy and costly to manufacture. A CH-47C helicopter, for example, may be provided with a hub machined from a 4340-steel forging which weighs in excess of 700 pounds and requires more than 70 machining operations to finish. Further, the size of conventional hubs for large helicopters approach the limits of forging feasibility.

The trend in metal rotor-hub material has been toward titanium alloys, which provide high strength-to-weight ratios and good corrosion resistance. Although lighter than their steel counterparts, titanium alloy hubs are more costly. A typical hub structure of the type with which this invention is concerned is used on a CH-54B helicopter, a heavy-lift helicopter which has a single main rotor with six articulated rotor blades. Its titanium-alloy main rotor hub is five feet wide and one foot high. The existing production hub has for this helicopter two structural elements, an upper hub and a lower plate. The upper hub consists of six cantilevered beams that radiate from a hollow circular cylinder. The lower plate is similarly star-shaped but much thinner. The beams of the upper hub alone support shears from lift and control movements. The hub is connected to the drive shaft by splines for torque transfer, cone seats for moment and a threaded nut for axial force. This configuration is effective and provides compact load paths that are appropriate for a dense material that exhibits high strength, and specific stiffness. However, this hub contributes substantially to the weight of the aircraft, utilizes costly materials, and requires extensive machining operations to manufacture.

It is the general aim of the present invention to provide improved hub assemblies for rotor systems which weigh less than comparable existing hub structures, cost less to manufacture, and which possess the requisite strength and durability of present comparable production hubs. A further aim of the invention is to provide improved hub structures which provide a high degree of damage tolerance, which are simple to maintain, and which may be readily installed and removed without special tools.

SUMMARY OF THE INVENTION

In accordance with the present invention a hub assembly for a rotor system comprises a plurality of plates for supporting blade retention means and which include axially spaced apart first and second plates and a pan plate. Each of the plates has a central aperture coaxially aligned with the central aperture in each of the other plates for receiving a rotor shaft coaxially therethrough. The first plate and the pan plate have outer marginal portions disposed in generally adjacent relation, however, the central portion of the pan plate is axially spaced from the central portion of the first plate. The assembly further includes means for transversely connecting adjacent outer marginal portions of the first plate and the pan plate and means for securing the plates to the rotor shaft.

DETAILED DESCRIPTION OF PREFERRED EMBODIMENTS

Figure 1:
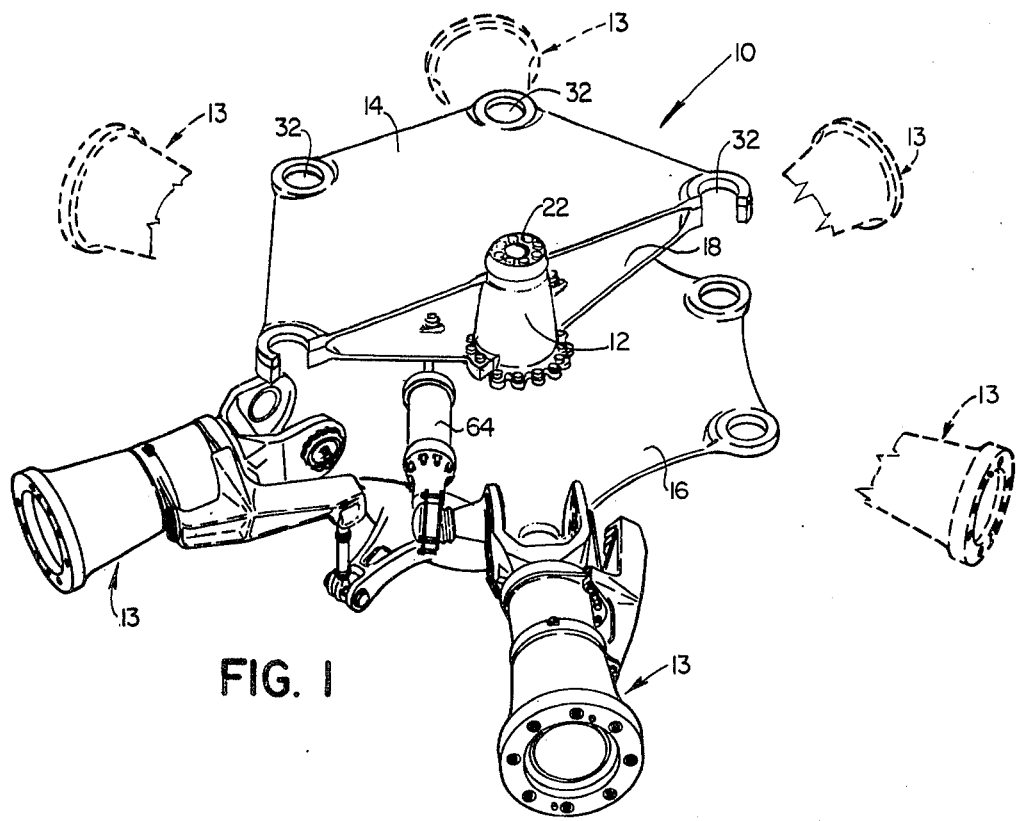
FIG. 1 is a fragmentary perspective view of a hub assembly embodying the present invention shown partially in axial section.
Figure 2:
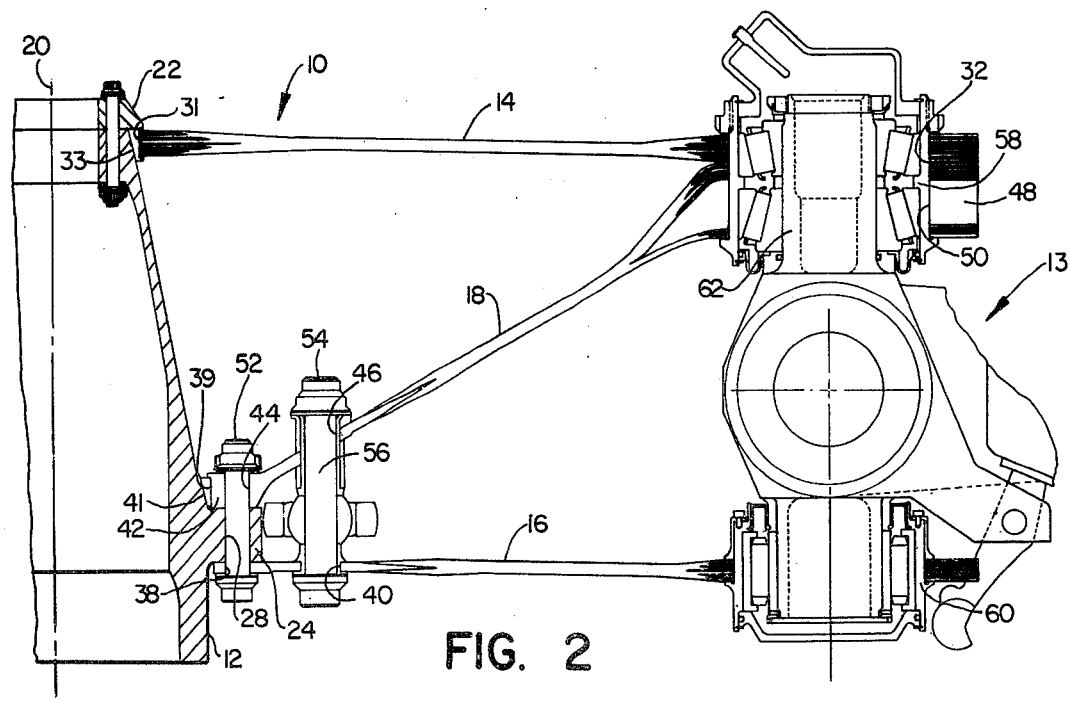
FIG. 2 is a somewhat enlarged fragmentary axial sectional view through the hub assembly of FIG. 1.

Turning now to the drawings, and referring first particularly to FIGS. 1 and 2, a hub assembly for an articulated rotor system of a large, heavy-lift helicopter and embodying the present invention is indicated generally by the reference numeral 10. The hub assembly 10 is shown mounted on a rotor shaft 12 which comprises the main rotor shaft of a helicopter (not shown). The illustrated hub assembly has six blade retention assemblies, indicated generally at 13, 13, is arranged to carry six articulated rotor blades (not shown), and generally comprises a plurality of plates which include an upper plate 14, a lower plate 16 and a pan plate 18. Each of the plates has a central aperture which is coaxially aligned with the central aperture in each of the other of the plates to receive the rotor shaft 12. The plates are centrally connected to and in direct engagement with the main rotor shaft 12, as will be hereinafter further discussed. The upper and lower plates 12 and 14 are generally radially disposed relative to the rotor shaft axis, indicated at 20, and are spaced a substantial axial distance apart, as shown in FIG. 1. The pan plate 16 comprises a dished plate which cooperates with the upper plate 14 and the drive shaft 12 to form an effective truss to resist vertical shears, such as produced by blade flapping and coning, as will be hereinafter further discussed.

Figure 3:
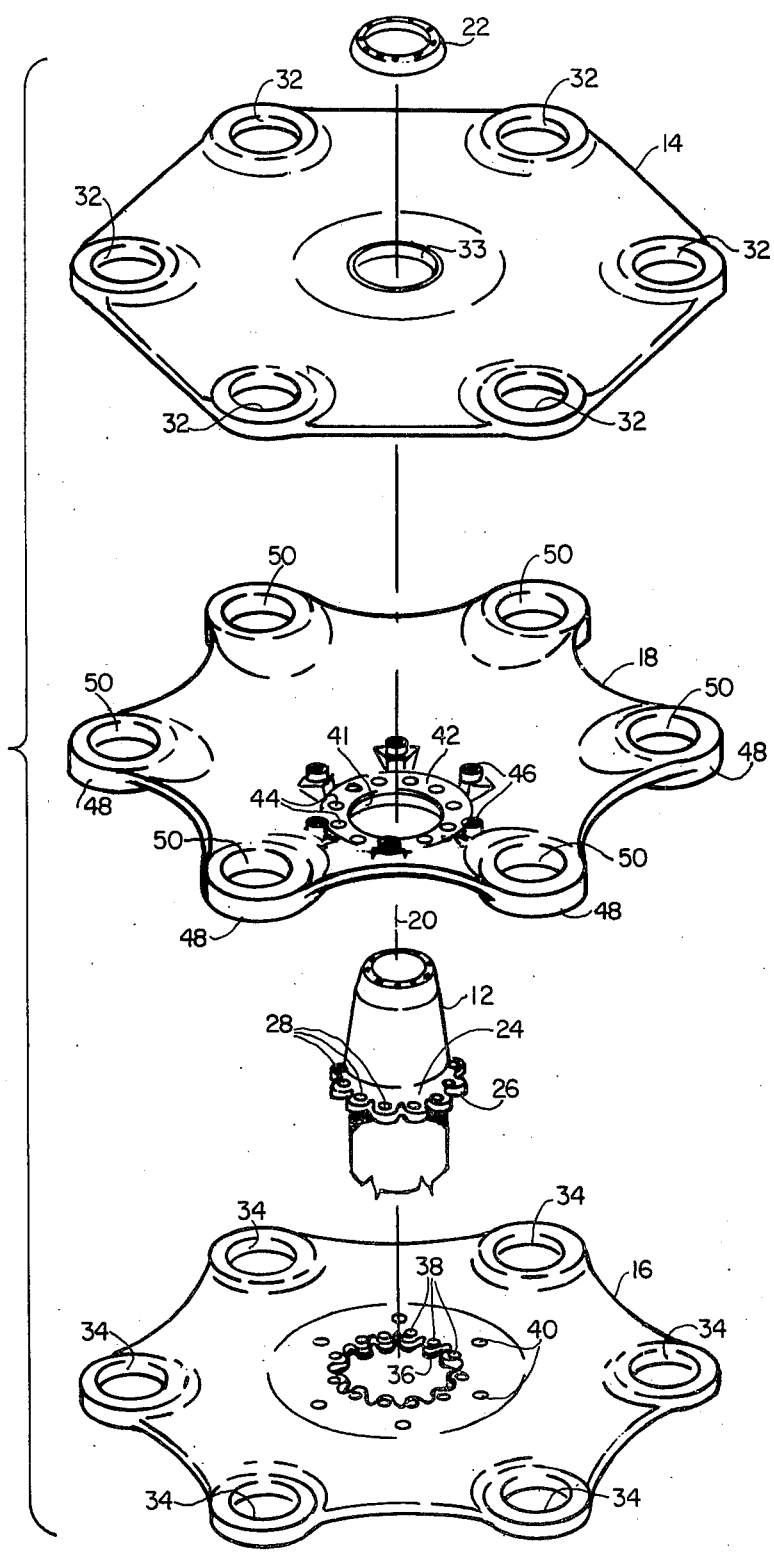
FIG. 3 is a somewhat enlarged exploded view showing parts of the hub assembly of FIG. 1.

The illustrated rotor shaft 12 is particularly adapted to receive the hub 10 and has a removeable retaining ring 22 bolted to its cone-shaped upper end portion. An integral annular flange 24 surrounds the shaft 12 in axially spaced relation to its upper end and has a scalloped outer peripheral surface 26, as best shown in FIGS. 1 and 3. Twelve vertically disposed and equiangularly spaced center bolt holes 28, 28 are formed in the mounting flange 24, as best shown in FIG. 3.

Figure 6:
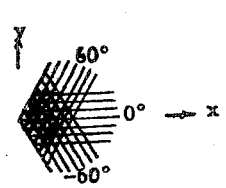
FIG. 6 is a schematic view and illustrates a preferred orientation of fibres in composite plates.

Considering now the hub assembly 10 in further detail, the plates which comprise the hub assembly may be made from metal or any other suitable material, but in accordance with the presently preferred embodiment of the invention the plates are formed from composite fibre materials, as for example, a graphite-epoxy laminate of generally constant-thickness construction with fibres oriented in the 0/±60° directions (0/±60) as illustrated in FIG. 6 wherein the X-axis corresponds to a radial direction. This orientation is appropriate for a six bladed rotor, because it produces symmetrical patterns of reinforcement that coincide with load paths. The plates are preferably formed from layups of preimpregnated materials reinforced with multiple metal laminae, as shown in FIG. 2. The plies and local reinforcements can be stacked in sequence to achieve any desired interleaving to produce required reinforcement.

The upper plate 14 comprises a generally hexagonal plate which has a central aperture 31 fitted with a cone seat 33. Six equiangularly spaced cylindrical apertures 32, 32 are formed in reinforced outer marginal portions of the upper plate, as best shown in FIG. 3. The upper plate 14 is substantially flat and of uniform thickness except in the areas of local reinforcement which surround its central aperture 30 and the marginal apertures 32, 32.

The lower plate 16 is similar in many respects to the upper plate 14 and comprises a flat plate of substantially uniform thickness except in its areas of local reinforcement. It has six cylindrical apertures 34, 34 formed in its outer marginal portion and uniformly spaced about its central axis for generally vertical alignment, in assembly, with the apertures 32, 32 in the upper plate 14. The lower plate includes a central mounting flange portion which has a scalloped radially inwardly facing peripheral surface 36 for complementing the radially outwardly facing peripheral surface 26 of the mounting flange 24. A ring of twelve center bolt holes 38, 38 is formed in the central flange portion of the plate for registry with the center bolt holes 28, 28 when the hub assembly 10 is assembled with the rotor shaft 12. A somewhat larger concentric ring of six damper bolt holes 40, 40 is also formed in the lower plate 16, substantially as shown in FIG. 3.

The pan plate 18 is generally cone shaped, has a central aperture 39 fitted with a cone seat 41, best shown in FIG. 2, and a central annular flange 42 provided with a ring of center bolt holes 44, 44 for registry with the center bolt holes 28, 28. A somewhat larger concentric ring of six damper bolt holes 46, 46 open through bosses which project above and below the plate 18 as best shown in FIG. 2. Six relatively thick bosses 48, 48 reinforced with multiple metal laminae are formed on the outer marginal portion of the pan plate 16. Cylindrical apertures 50, 50 are formed in the bosses 48, 48 for registry, in assembly, with associated apertures 32, 32 in the upper plate 14. Twelve captive center bolt nuts 52, 52 and six captive damper bolt nuts 54, 54 are non-rotatably mounted on the upper surface of the pan plate 18 in alignment with their respective bolt holes, as shown in FIG. 2. However, for clarity of illustration these captive nuts are not shown in FIG. 3.

The plates 14, 16 and 18 which comprise the hub assembly 10 are retained in assembled relation with each other by the blade retention assemblies 13, 13 and by six damper bolts 56, 56, as best shown in FIG. 2, so that the hub assembly 10 may be installed on or removed from the rotor shaft 12 as a unit. The illustrated blade retention assemblies 13, 13 are conventional and will not be described in detail, and it should be understood that other blade retention means may be utilized in practicing the invention.

A typical blade retention assembly, as shown in FIG. 2, includes an upper bearing housing and nut assembly 58. The upper bearing housing is contained within associated apertures 50 and 32 and secured by its associated nut to transversely connect adjacent outer marginal portions of the upper plate 14 and the pan plate 18. The illustrated blade retention assembly further includes a lower bearing housing 60 retained within an associated aperture 34 in the lower plate. A conventional lead-lag pin 62, which comprises a part of the blade retention assembly, is journalled at its upper end by tapered-roller upper bearings which also serve to retain it in the upper bearing housing. A nut at the upper end of the lead-lag pin 62 serves to further retain the lead-lag pin relative to the upper bearing housing assembly 58. The lower end of the lead-lag pin 62 is journalled in a straight-roller lower bearing contained within the lower housing and free to float axially on the lead-lag pin. Six dampers are supported on the damper bolts 56, 56 between the pan plate 18 and the lower plate 16 and act between the latter plates and the blade retention assemblies 13, 13 in conventional manner to damp blade movements. One typical damper is shown in FIG. 1 and indicated by the numeral 64.

Preparatory to installing the hub assembly 10 the retaining ring 22 is removed from the rotor shaft 12. As the hub assembly 10 is positioned on the rotor shaft the cone shaped upper end portion of the shaft cooperates with the central aperture in the lower plate 16 to effect general coaxial alignment between the hub assembly and the shaft. When the scalloped central flange portion of the lower plate engages the mounting flange 24 not more than 15 degrees of annular movement will be required to align the scalloped inner peripheral surface 36 on the lower plate with the scalloped outer peripheral surface 26 on the mounting flange, if uniform scalloped patterns are arranged to repeat every 15 degrees. When the complementary scalloped edge portions of the lower plate and the mounting flange are aligned, the lower plate 16 is free to pass downwardly over the mounting flange 24 until the central flange 42 on the pan plate engages the upper surface of the mounting flange. The upper surface of the central flange portion of the lower plate will now be in alignment with the lower surface of the mounting flange 24. Thereafter it is only necessary to rotate the hub assembly in either direction relative to the main rotor shaft 12 to effect registration of the center bolt holes 38, 38 and 44, 44 with corresponding center bolt holes 28, 28 in the mounting flange 24. If desired, one of the scallops and its associated bolt hole may be slightly angularly offset to provide a locating means to assure a unique assembly relationship between the parts. Twelve center bolts are next inserted upwardly through the bolt receiving opening 38, 38 and threaded into engagement with the captive nuts 52, 52 mounted on the pan plate 18 and are tightened to seat the cone seat 41. The installation is completed by fastening the retaining ring 22 to the upper end of the rotor shaft 12 to seat the cone seat 33. The precedure is reversed to remove the hub assembly from the rotor shaft. No special tools are required.

Figure 7:
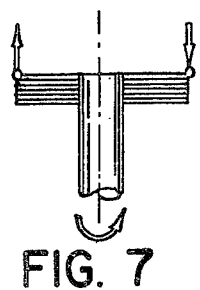
FIG. 7 is a schematic view and illustrates a conventional beam concept for a transverse load.

Transverse loads are those that lie in a direction perpendicular to the plane of the rotor hub and parallel to the centerline of the rotor drive shaft. The most important transverse loads are the vibratory 1/rev loads upon the hub caused when the pilot controls the aircraft by tilting the axis of rotation of the rotor relative to the axis of rotation of the drive shaft. Of lesser importance but still significant is the symmetrical lift load. The conventional load path for transverse loads is to beam them to the rotor shaft as shown in FIG. 7.

Figure 8:
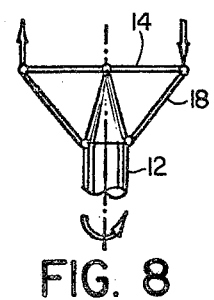
FIG. 8 is a schematic view and illustrates the truss concept of the present invention.

Structures in accordance with the present invention transmit shear by direct, in-plane, axial loads in a diagonal plate, such as the plate 18, hereinbefore described. In effect, shear transfer is closely related to the shear transfer that occurs in a simple two-dimensional truss, and the present structure is so illustrated in FIG. 8. The real behavior, however, is much more redundant, because the hub assembly is a three-dimension structure. The load paths are highly redundant and diffuse so that the hub will be quite tolerant to areas of local ballistics damage, as may occur in military operation. The present concept also has the advantage of permitting shear transfer to be accomplished through large areas of highly reliable primary bonds made during initial fabrication, as when composite materials are utilized. The present concept also eliminates the heavy built-up and heavy bolted joint used in previous structures to transfer hub loads to the shaft spindle, since no spindle, as such, is employed.

Major loads are transmitted primarily by direct stresses and shears in the planes of the plates which lie along efficient load paths. Centrifugal forces are bridged by the lead-lag pins to the planes of the upper and lower plates. If composite materials are used to make the plates the loads may be introduced into the composite plies by interleaved metal shims, as shown, which provide durable surfaces for contact with the bearing housings and large areas of bond surface for the composite. Once in the plates, the loads spread out, following highly redundant paths. Load diffusion may be fostered by a pattern of reinforcement, which provides equal-stiffness load paths for centrifugal forces in both a hexagonal ring direction from pin to adjacent pin and a radial direction from pin to opposite pin.

The hub provides a new direct load path for torque without the use of splines and a central cylinder as in a conventional hub structure. Torque is transferred from a scalloped flange on the drive shaft to metal fittings in the pan and the lower plates by twelve bolts, which are loaded in double shear. Balanced-stiffness scarf joints transfer the torque from the fittings to the composite plates. The upper plate does not participate in the torque path.

Vertical shears are produced at the lead-lag pins by the blade flapping and coning. The upper and the pan plates support the vertical shears by the truss action of the in-plane forces in each plate. Vertical shears also produce local interlaminar shearing stresses in the bosses of the pan plate. However, these bosses are thick to control these stresses. At the center of the hub, approximately three-quarters of the hub moment is transfered from the upper and the pan plates to the rotor shaft by radial forces at the cone seats; the remainder is transferred by vertical shears to the mounting flange on the rotor shaft. The cone seats are preloaded as the bolts which secure the hub assembly to the rotor shaft are tightened during assembly.

Figure 4:
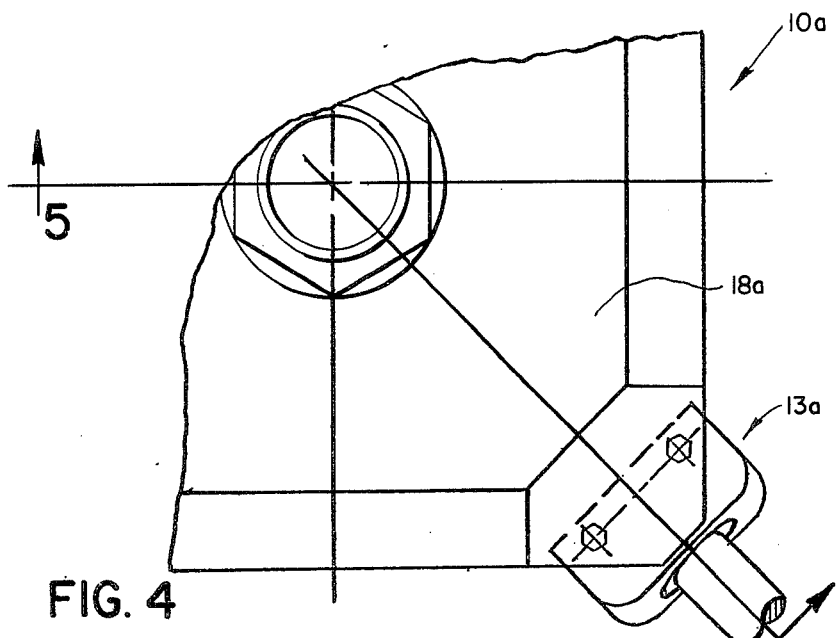
FIG. 4 is a fragmentary plan view of another hub assembly embodying the present invention.
Figure 5:
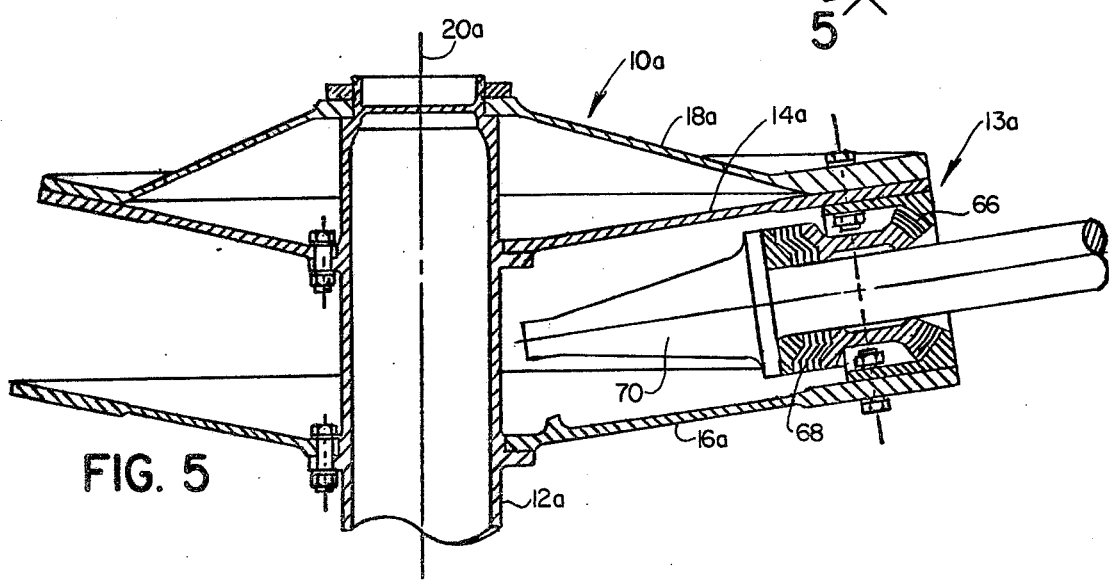
FIG. 5 is a fragmentary sectional view taken generally along the line 5—5 of FIG. 4.

Referring now to FIGS. 4 and 5. Another hub assembly embodying the present invention is indicated generally at 10a and shown secured to a rotor shaft 12a for rotation about the rotor shaft axis, indicated at 20a. The hub assembly 10a is adapted to carry four rotor blades and has a substantially square upper plate 14a, a substantially square lower plate 16a and a substantially square pan plate indicated at 18a which is positioned above the upper plate. The upper and lower plates 14 and 16 are generally radially disposed and are nearly flat, but are shown to have a shallow general cone shape which corresponds to the stead 1-g cone angle of a blade. The upper and lower plates are centrally connected by bolts directly to the rotor shaft through central flanges on the plates and integral mounting flanges on the rotor shaft, substantially as shown. The pan plate 18 comprises a dished plate centrally connected to the upper end of the rotor shaft 12a in vertically spaced relation to the central portion of the upper plate 14a. Adjacent outer marginal portions of the upper plate 14a and the pan plate 18a are transversely connected by bolts which also secure four blade retention assemblies 13a, 13a (one shown). The illustrated blade retention assembly comprises an elastomeric articulation. A spherical bearing 66 provides for the lead-lag and flapping motions. A chevron-stack thrust bearing 68 allows feathering motions. A rotor blade shank 70 extends inboard for contact with flapping stops (not shown) and attachment of a damper (not shown).

The principal advantage of the embodiment 10a resides in the clear envelope it provides between the upper and lower plates to accommodate structures, such as the blade retention assembly 13a hereinbefore generally described. The load paths in this embodiment are similar to those described with reference to the hub assembly 10a except for the transmission of torque which is shared by the upper and lower plates 14 and 16.

In the aforedescribed embodiment 10a, the pan plate 18a is shown located above the substantially flat plates 14a and 16a, however, it should be understood that the pan plate could also be located below the latter plates. When the plates are made from composite materials utilizing fibre material, the pattern of fibres may differ from the pattern shown in FIG. 6. A plate for a substantially square hub assembly, such as the assembly 10a, adapted to carry four rotor blades, may, for example, have fibres oriented in the 0/±45° directions in its body or inner regions and other fibres in its outer marginal portions oriented in parallel alignment with its peripheral edges to form a square pattern around its periphery. The specific orientation of the fibres will, of course, be chosen with reference to the shape of the hub assembly and the arrangement of its blade retentions.

The invention has been illustrated with reference to four and six bladed rotor systems, however, it should be understood that the concepts hereinbefore described are applicable to any rotor system having two or more blades, and such structures are contemplated within the scope of the invention.

Additional data relating to the aforedescribed embodiments may be found in a report entitled, "COMPOSITE ROTOR HUB," published by The American Helicopter Society, Washington, D.C. and presented at the 33rd Annual National Forum of The American Helicopter Society, Washington, D.C., May, 1977 by Robert J. Mayerjak, Kaman Aerospace Corporation, Bloomfield, Conn. and George T. Singley, III, U.S. Army Air Mobility Research and Development Laboratory, Fort Eustis, Va. This report is further identified by Reprint No. 77.33.82 and is hereby incorporated by reference as a part of the present disclosure.

I claim:

1. A hub assembly for a rotor system comprising a plurality of plates for supporting blade retention means and including a generally radially disposed lower plate, a generally radially disposed upper plate axially spaced above and from said lower plate, and a pan plate, each of said plates having an inner marginal portion an outer marginal portion and an intermediate portion integrally connected to said inner and outer marginal portions and extending therebetween, said inner marginal portions comprising means for securing said plates to a rotor shaft, each of said plates having a central aperture coaxially aligned with the central aperture in each of the other of said plates for receiving the rotor shaft therethrough, said upper plate and said pan plate having said outer marginal portions thereof in generally adjacent relation, said pan plate having its inner marginal portion axially spaced from the inner marginal portion of said upper plate, said pan plate having its intermediate portion spaced away from the intermediate portions of said upper and said lower plates, and means for transversely connecting adjacent outer marginal portions of said upper plate and said pan plate.

2. A hub assembly for a rotor system as set forth in claim 1 wherein said pan plate comprises a dished plate.

3. A hub assembly for a rotor system as set forth in claim 2 wherein said dished plate is generally cone shaped.

4. A hub assembly for a rotor system as set forth in claim 1 wherein said pan plate is disposed intermediate said upper plate and said lower plate and said inner marginal portion of said pan plate is spaced axially below said inner marginal portion portion of said upper plate.

5. A hub assembly for a rotor system as set forth in claim 1 wherein said pan plate is disposed above said upper plate and said inner marginal portion of said pan plate is axially upwardly spaced from said inner marginal portion of said upper plate.

6. A hub assembly for a rotor system as set forth in claim 1 wherein said means for transversely connecting said outer marginal portions comprises rotor blade retention means.

7. A hub assembly for a rotor system as set forth in claim 6 wherein said blade retention means comprises pairs of opposing bearing housings including upper bearing housing and nut assemblies carried by and connecting said adjacent outer marginal portions of said upper plate and said pan plate and opposing lower bearing housings carried by said lower plate and a plurality of lead-lag pins each journalled in a respectively associated pair of said bearing housings and extending transversely of said plates.

8. A hub assembly for a rotor system as set forth in claim 1 wherein said plates are made from composite materials.

9. A hub assembly for a rotor system as set forth in claim 8 wherein said composite materials comprise a graphite-epoxy laminate.

10. A hub assembly for a rotor system as set forth in claim 1 wherein the rotor shaft has a coaxial annular flange which includes a scalloped outer peripheral edge and said central aperture of one of said plates has a scalloped inner peripheral edge for complementing the scalloped outer peripheral edge of said flange to allow said flange to pass through said central aperture in said one plate in at least one position of annular orientation of said hub assembly relative to the rotor shaft.

11. A hub assembly for a rotor system as set forth in claim 10 wherein said inner marginal portion of said lower plate comprises a central flange defining said scalloped inner peripheral edge and for engagement with the lower surface of the annular flange, said inner marginal portion of said pan plate comprises another central flange for engagement with the upper surface of the annular flange, and said securing means includes a plurality of fasteners for securing the central flanges on said lower plate and said pan plate in respective engagement with the upper and lower surfaces of the annular flange.

12. A hub assembly for a rotor system as set forth in claim 1 wherein said inner marginal portions comprise means for attaching said plates in direct connected engagement with the rotor shaft.

13. A hub assembly for a rotor system as set forth in claim 1 wherein the rotor shaft has an annular mounting flange thereon and said securing means comprises central flanges defined by said inner marginal portions of said lower plate and said pan plate and fastener means for securing said central flanges to the mounting flange.

14. A hub assembly for a rotor system as set forth in claim 13 wherein said rotor shaft has a cone-shaped upper end portion, said central aperture in said upper plate complements an associated part of the shaft upper end portion, and said securing means includes a retaining member attached to the upper end of said shaft in bearing engagement with said inner marginal portion of said upper plate.

15. A hub assembly for a rotor system as set forth in claim 1 wherein the blade retention means comprises six blade retention assemblies and said upper plate comprises a generally hexagonal plate.

16. A hub assembly for a rotor system comprising a plurality of plates for supporting blade retention means and including a first plate, a second plate axially spaced from said first plate, and a third plate, each of said plates having an inner marginal portion defining a central aperture coaxially aligned with the central aperture in each of the other of said plates for receiving a rotor shaft therethrough, each of said plates having an outer marginal portion and an intermediate portion integrally connected to said inner marginal portion and said outer marginal portion and extending therebetween, said intermediate portion of each of said plates being spaced away from the intermediate portions of the other of said plates, said outer marginal portions of first plate and said third plate being in generally adjacent relation, said third plate having its central portion axially spaced from the central portion of said first plate, means for transversely connecting adjacent outer marginal portions of said first plate and said third plate, and means for securing said plates to said rotor shaft.

17. A hub assembly for a rotor system as set forth in claim 16 wherein at least one of said plates comprises a dished plate.

18. A hub assembly for a rotor system as set forth in claim 17 wherein said dished plate is generally cone shaped.

19. A hub assembly for a rotor system as set forth in claim 16 wherein said connecting means comprises a blade retention assembly and said assembly includes a damper disposed between and connected to two of said plates and to said blade retention assembly.

20. The combination comprising a rotor shaft including an annular flange having a scalloped radially outwardly facing first peripheral surface and a ring of spaced bolt holes therethrough, and a hub assembly including a plurality of plates for supporting blade retention means, each of said plates having a central opening for receiving said rotor shaft therethrough, one of said plates having a central mounting flange surrounding its central opening, said central opening in said one plate being defined by a scalloped axially inwardly facing second peripheral surface for complementing said first peripheral surface in at least one position of angular orientation of said hub assembly relative to said rotor shaft during assembly of said hub assembly with said rotor shaft and through which said first peripheral surface may freely pass when said hub assembly is in at least said one position of angular orientation, said central flange having a ring of spaced bolt receiving openings therethrough for registry with said bolt holes when said hub assembly is assembled with said rotor shaft, means for securing said plates to said rotor shaft, and means for transversely connecting outer marginal portions of said plates.

21. A hub assembly for a rotor system as set forth in claim 16 wherein said intermediate portion of each of said plates is substantially imperforate.

* * * * *